(12) United States Patent
Bae et al.

(10) Patent No.: US 9,515,308 B2
(45) Date of Patent: Dec. 6, 2016

(54) BATTERY PACK

(71) Applicant: SAMSUNG SDI CO., LTD., Yongin-si, Gyeonggi-do (KR)

(72) Inventors: Sang-Hoon Bae, Yongin-si (KR); Sang-Min Nam, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 113 days.

(21) Appl. No.: 14/618,903

(22) Filed: Feb. 10, 2015

(65) Prior Publication Data

US 2015/0236327 A1 Aug. 20, 2015

(30) Foreign Application Priority Data

Feb. 17, 2014 (KR) .................. 10-2014-0017718

(51) Int. Cl.
*H01M 2/22* (2006.01)
*H01M 2/30* (2006.01)
*H01M 2/34* (2006.01)
*H01M 10/052* (2010.01)

(52) U.S. Cl.
CPC ............ *H01M 2/22* (2013.01); *H01M 2/30* (2013.01); *H01M 2/34* (2013.01); *H01M 10/052* (2013.01); *H01M 2200/00* (2013.01); *H01M 2220/30* (2013.01); *Y02E 60/122* (2013.01)

(58) Field of Classification Search
CPC .......... H01M 2/22; H01M 2/30; H01M 2/34; H01M 10/052
See application file for complete search history.

(56) References Cited

U.S. PATENT DOCUMENTS

| 5,769,657 | A | 6/1998 | Kondo et al. | |
| 2011/0008652 | A1* | 1/2011 | Lee | H01M 2/0404 429/7 |
| 2011/0268996 | A1* | 11/2011 | Lee | H01M 2/30 429/7 |
| 2012/0121937 | A1* | 5/2012 | Kwak | H01M 10/42 429/7 |
| 2012/0142230 | A1* | 6/2012 | Baek | H01M 2/22 439/754 |

FOREIGN PATENT DOCUMENTS

| JP | 8-229852 A | 9/1996 |
| KR | 10-2011-0059386 A | 6/2011 |
| KR | 10-2012-0029981 A | 3/2012 |

* cited by examiner

*Primary Examiner* — Stewart Fraser
(74) *Attorney, Agent, or Firm* — Lewis Roca Rothgerber Christie LLP (57) ABSTRACT

A battery pack includes one or more bare cells, a protective circuit module, and one or more terminals. The protective circuit module is electrically coupled to the bare cell. The one or more terminals are on a first surface of the protective circuit module. The one or more terminals are configured to be electrically coupled to an external device. In the battery pack, one of the terminals includes a support portion coupled to the protective circuit module, a pair of body portions extended in a direction away from the first surface of the protective circuit module at the support portion, and a plurality of extending portions extended in different directions from opposite sides of the pair of body portions. The extending portions extend parallel to the first surface of the protective circuit module.

18 Claims, 7 Drawing Sheets

BATTERY PACK

CROSS-REFERENCE TO RELATED APPLICATION

This application claims priority to and the benefit of Korean Patent Application No. 10-2014-0017718, filed on Feb. 17, 2014, in the Korean Intellectual Property Office, the entire contents of which are incorporated herein by reference in their entirety.

BACKGROUND

1. Field

An aspect of the present Invention relates to a battery pack.

2. Description of the Related Art

Recently, battery packs have been variously used as power sources of potable electronic devices. As the portable electronic devices are used in various fields, demands for battery packs have rapidly increased. The battery packs can be charged/discharged a plurality of times, and thus are economically and environmentally efficient. Accordingly, the use of the battery packs is encouraged.

As the small size and light weight of portable electronic devices are required, the small size and light weight of battery packs are also required. However, since a material such as lithium having high reactivity is provided in the inside of the battery pack, the small size and light weight of the battery pack is limited due to the safety of the battery pack. Accordingly, a variety of studies have been conducted to develop a battery pack that can become small in size and light in weight while obtaining improved stability.

SUMMARY

Embodiments of the present invention are directed to a battery pack. In one embodiment, the battery pack includes one or more bare cells, a protective circuit module electrically coupled to the bare cell, and one or more terminals on a first surface of the protective circuit module. The one or more terminals are to be electrically coupled to an external device. At least one of the terminals includes a support portion coupled to the protective circuit module, a pair of body portions extended in a direction away from the first surface of the protective circuit module at the support portion, and a series of extending portions extending in different directions from opposite sides of the pair of body portions. The extending portions of the terminal extend parallel to the first surface of the protective circuit module.

The support portion may Include a base portion parallel to the first surface, and a pair of flange portions at opposite ends of the base portion perpendicular to the first surface.

The base portion may include one or more first fastening portions defined therein, and the protective circuit module may include a second fastening portion coupled to the one or more first fastening portions.

The protective circuit module may have one or more openings in which one or more of the pair of flange portions are mounted.

The one or more openings in the protective circuit module may include a first opening at an outer peripheral portion of the protective circuit module and a second opening having a shape of a rectangular slot Inside the protective circuit module.

The pair of body portions may include first and second body portions at opposite ends of the base portion. The first and second body portions may be spaced from each other and extend parallel to each other. The extending portions may include first and second extending portions at opposite ends of the first body portion, and third and fourth extending portions at opposite ends of the second body portion.

Each of the first and second body portions may include a first area having a width corresponding to a width of the support portion and a second area extending from the first area. The second area may have a width narrower than the width of the first area.

The first to fourth extending portions may be coupled to the second area and the first to fourth extending portions may be adjacent upper portions of the first and second body portions.

The first and third extending portions may be respectively at one end of the first and second body portions and may extend toward each other. The second and fourth extending portions may be respectively at an opposite end of the first and second body portions and may extend toward each other.

The first to fourth extending portions may each respectively Include inclination portions directly coupled at opposite ends of the first and second body portions and converging toward each other, contact portions coupled to the inclination portions and extending in a direction parallel to the first and second body portions, and spacing portions coupled to the contact portions and diverging from each other at the contact portions.

The spacing portions may be rounded.

The sizes of the first and third extending portions may be the same, the sizes of the second and fourth extending portions may be the same, and the sizes of the first and third extending portions may be greater than the sizes of the second and fourth extending portions.

At least a portion of each of the first and third extending portions may contact each other, and at least a portion of each of the second and fourth extending portions may contact each other.

The portion at which the first and third extending portions contact each other or the portion at which the second and fourth extending portions contact each other further may include surface roughness.

The extending portions may be symmetric to each other about a centerline of the pair of body portions.

The pair of body portions may Include a pair of surfaces facing each other, and one or more ribs may be on each of the surfaces facing each other.

The one or more ribs may extend along a direction in which the first and second body portions extend, and the one or more ribs may extend to a lower end portion of the first body portion or the second body portion adjacent the support portion.

The protective circuit module may be opposite to the one or more bare cells, and the first surface of the protective circuit module may be opposite to an inner surface of the protective circuit module facing the one or more bare cells.

As described above, according to embodiments of the present Invention, it is possible to provide a battery pack having a new terminal.

Further, it may be possible to provide a battery pack which can Improve the mounting space efficiency of components in a protective circuit module.

This summary is provided to introduce a selection of concepts that are further described below in the detailed description. This summary is not Intended to identify key or essential features of the claimed subject matter, nor is it intended to be used in limiting the scope of the claimed subject matter.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it may be the only element between the two elements, or one or more Intervening elements may also be present. Like reference numerals refer to like elements throughout.

DETAILED DESCRIPTION

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" an element, it can be directly on the element or be Indirectly on the element with one or more Intervening elements Interposed therebetween. Also, when an element is referred to as being "connected to" or "coupled to" another element, it can be directly connected or coupled to the another element or be indirectly connected or coupled to the another element with one or more intervening elements Interposed therebetween. Hereinafter, like reference numerals refer to like elements.

Figure 1:
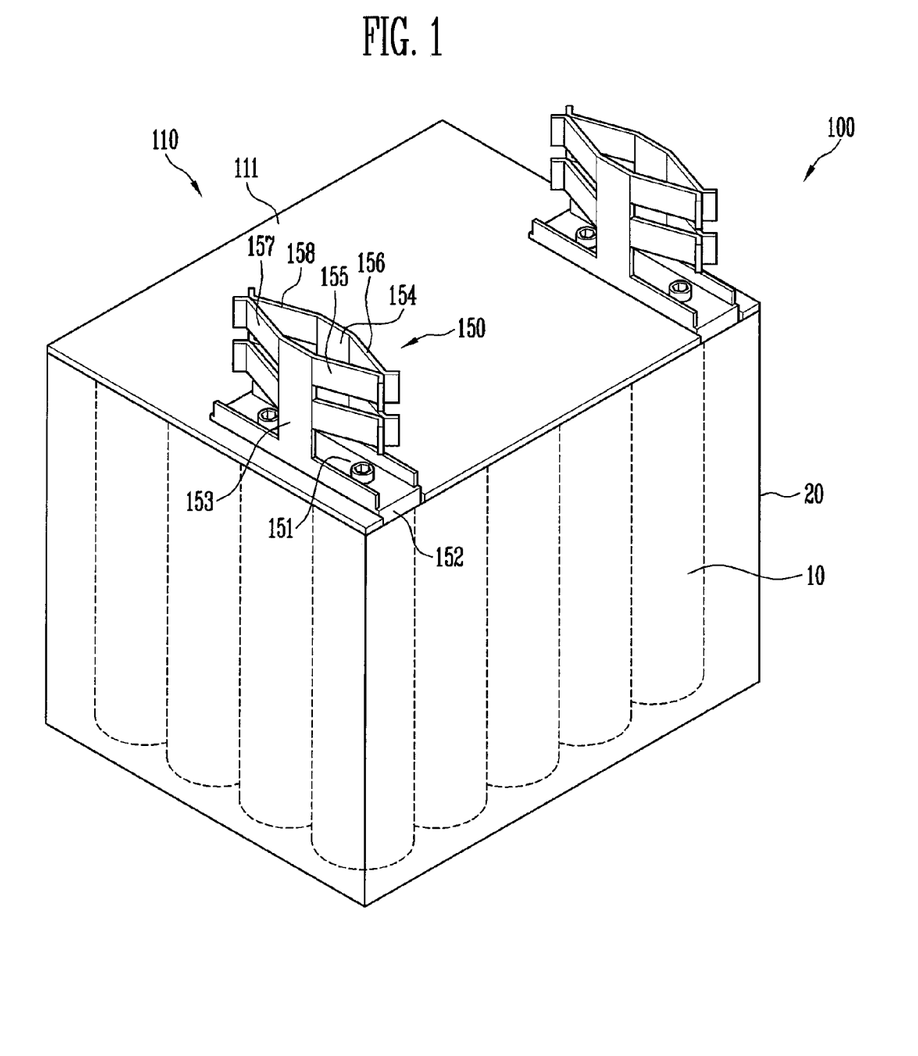
FIG. 1 is a perspective view of a battery pack according to an embodiment of the present invention.

FIG. 1 is a perspective view of a battery pack according to an embodiment of the present invention.

The battery pack 100 according to this embodiment Includes one or more bare cells 10; a protective circuit module 110 electrically coupled to the bare cell 10, the protective circuit module 110 having a first surface 111; and one or more terminals 150 provided on the first surface 111 of the protective circuit module 110 to be electrically coupled to an external device. The terminal 150 includes support portions 151 and 152 coupled to the protective circuit module 110. The terminal 150 also includes a pair of body portions 153 and 154 extending upward or outward from the support portion 151. The body portions 153 and 154 may extend perpendicular to the first surface 11 of the protective circuit module 110. The terminal 150 further includes a plurality of extending portions 155, 156, 157 and 158 extending in different directions from opposite sides of the pair of body portions 153 and 154. For example, in the Illustrated embodiment, the pair of extending portions 155 extend outward from one side of the body portion 153, the pair of extending portions 157 extend outward from an opposite side of the body portion 153, the pair of extending portions 156 extend outward from one side of the body portion 154, and the pair of extending portions 158 extend outward from an opposite side of the body portion 154. The extending portions 155, 156, 157 and 158 may extend parallel to the first surface 111 of the protective circuit module 110. A surface of the protective circuit module 110 faces the bare cell 10, and the first surface 111 may be a surface opposite to the surface facing the bare cell 111.

The battery pack 100 may include the one or more bare cells 10 capable of being repeatedly charged/discharged, and the protective circuit module 110 is configured to control the electrical flow of the bare cell 10. The battery pack 100 may further include a housing 20 configured to accommodate the bare cell 10 in order to stably cover and protect the bare cell 10. The protective circuit module 110 may be mounted to the housing 20 or be accommodated together with the bare cell 10 in the housing 20. The housing 20 may have any suitable shape. In one embodiment, the shape of the housing 20 may correspond to the shape of the external electronic devices into which the battery pack 100 is configured to be mounted.

The bare cell 10 may include a battery case, and an electrode assembly and an electrolyte, which are accommodated in the battery case. The electrode assembly may include positive and negative electrode plates having different polarities from each other, and a separator Interposed between the positive and negative electrode plates. For example, the positive electrode plate may be formed by coating a positive electrode active material including lithium on a base material, and the negative electrode plate may be formed by coating a negative electrode active material including carbon on a base material. The separator may prevent the positive and negative electrode plates from directly contacting each other. The separator may Include a plurality of pores to function as a path of the electrolyte.

The battery pack 100 may operate as a power source of an external electronic device. For example, the external electronic device may Include a large-sized electric tool which requires high current and high voltage. One side of the terminal 150 has P(+) and the other side of the terminal 150 has P(−). Each side of the terminal 150 may be a high current terminal for applying (discharging) current to the external electrode device or charging the bare cell 10. Hereinafter, the terminal 150 according to this embodiment will be described in detail.

Figure 2:
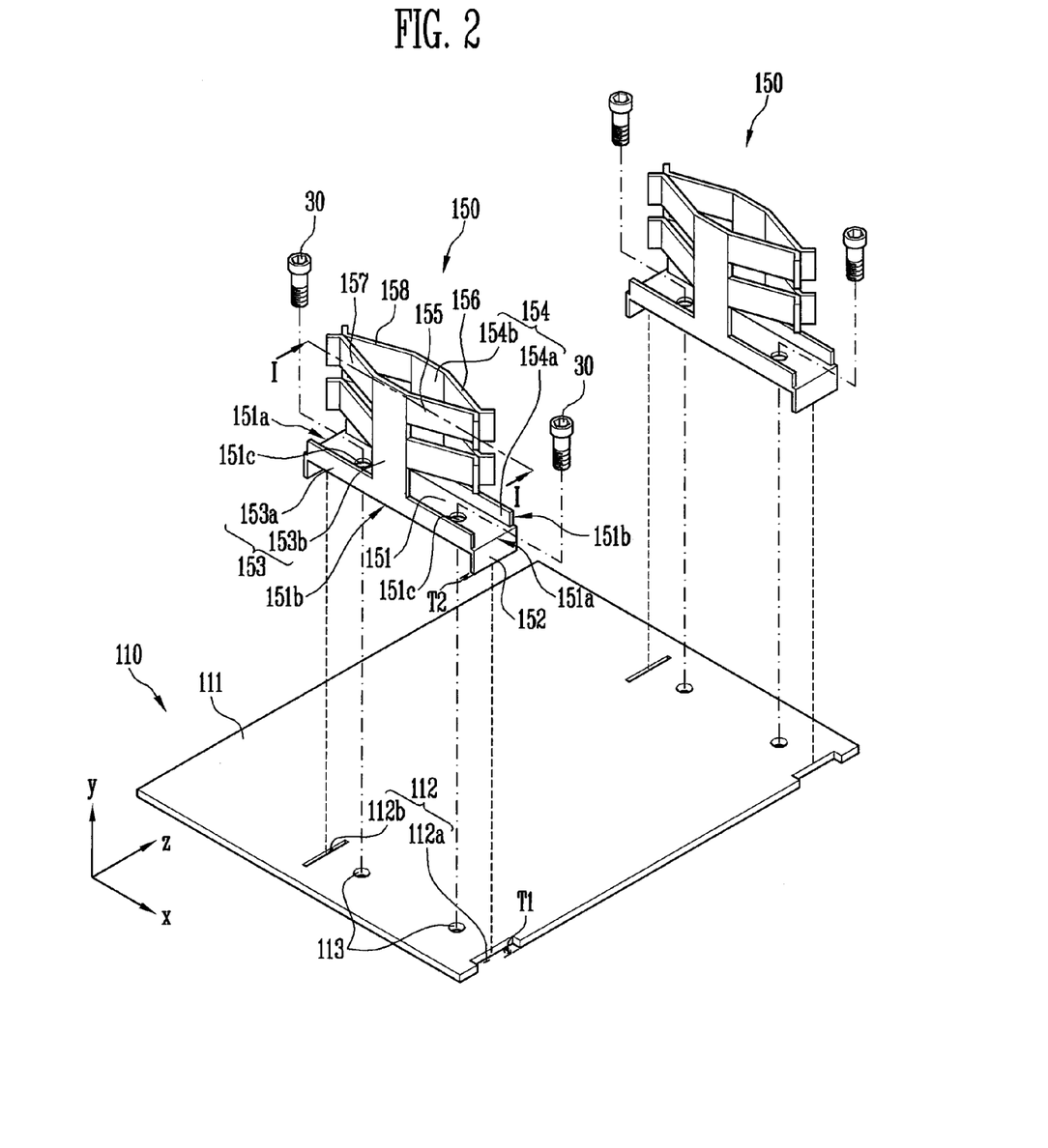
FIG. 2 is a perspective view of a protective circuit module and a terminal of FIG. 1.
Figure 3:
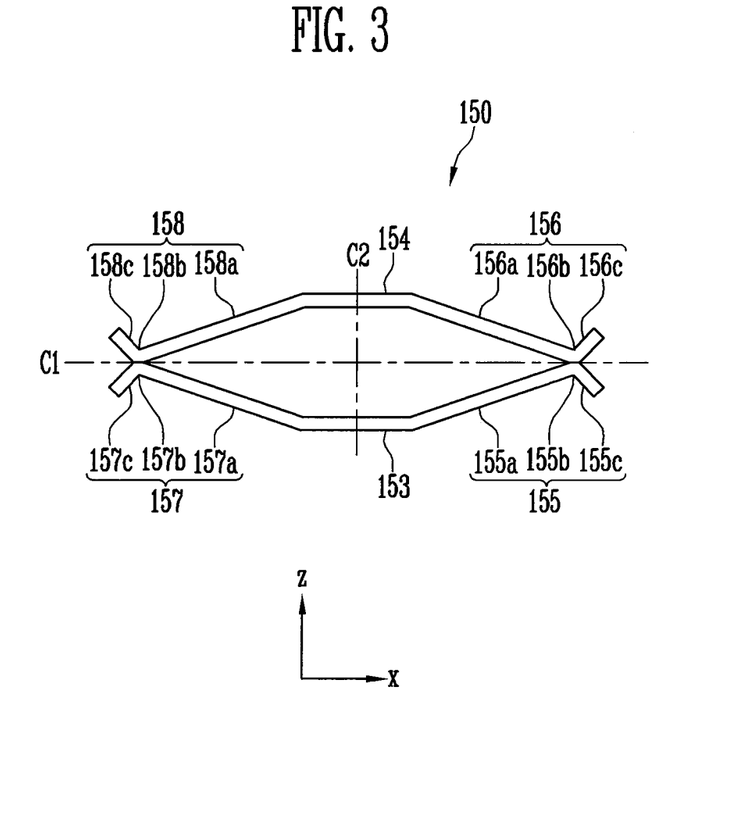
FIG. 3 is a sectional view taken along the line I-I of the terminal of FIG. 2.

FIG. 2 is a perspective view of the protective circuit module and the terminal of FIG. 1. FIG. 3 is a sectional view taken along the line I-I of the terminal of FIG. 2.

Referring to FIGS. 2 and 3, the terminal 150 may be provided on the first surface 111 of the protective circuit module 110 and coupled to the protective circuit module 110. The protective circuit module 110 controls the charging/discharging of the bare cells 10, thereby Improving the reliability and stability of the battery pack. The terminal 150 may transfer electric energy from the bare cells 10 to the outside through the medium of the protective circuit module 110.

A secondary element, a circuit, various components and the like may be mounted on the protective circuit module. In case of a protective circuit module such as a high-specification smart PCM, various chips and a plurality of components are mounted on the protective circuit module, and therefore, the protective circuit module Includes a mounting space for these components. Since the size of the protective circuit module 110 is limited by the external appearance of the battery pack 100 and the size of the external electronic devices into which the battery pack 100 is configured to be mounted, it is desirable to efficiently use the mounting space in the protective circuit module. When the mounting space in the protective circuit module 110 is small, the failure rate of the protective circuit module may increase. Therefore, the unit cost of the protective circuit module may be Increased. On the other hand, in the battery pack according to this embodiment, the space that the terminal occupies in the protective circuit module Is decreased by changing the shape of the terminal, and thus it is possible to increase the space in which components and the like can be mounted in the protective circuit module.

The terminal 150 according to this embodiment may include support portions 151 and 152, body portions 153 and 154, and extending portions 155, 156, 157 and 158, which are spaced apart in the y direction from the first surface 111 of the protective circuit module 110. The support portions 151 and 152 are portions provided adjacent to the protective circuit module 110, and may include a base portion 151 provided in parallel to the first surface 111, and a pair of flange portions 152 on opposite ends 151*a* of the base portion 151 bent perpendicular to the first surface 111 of the protective circuit module 110. For example, the base portion 151 in the support portions 151 and 152 may be formed in an approximately rectangular shape. In this case, the flange portions 152 bent perpendicular to the first surface 111 (in the −y direction) are respectively provided at any one pair of ends 151*a* of the base portion 151 among the ends facing each other, and the body portions 153 and 154 may be respectively provided at the other pair of ends 151*b* of the base portion 151. Additionally, in the illustrated embodiment, the body portions 153 and 154 are bent upwards (in the +y direction) and the flange portions 152 are bent downwards (in the −y direction) (e.g., the body portions 153 and 154 extend in a direction along the y-axis opposite to that of the flange portions 152).

The base portion 151 has one or more first fastening portions 151*c* formed therein and the protective circuit module 110 has one or more second fastening portions 113 formed therein. The second fastening portions 113 are configured to be coupled to the first fastening portions 151*c*. For example, the first and second fastening portions 151*c* and 113 may be formed in the shapes of holes corresponding to each other. The first and second fastening portions 151*c* and 113 may be fastened together by a separate fastening member 30 such as a bolt or stud.

The protective circuit module 110 may include one or more openings 112 (e.g., slots or notches) in which the flange portions 152 of the terminal 150 are mounted. The openings 112 may Include a first opening 112*a* provided at an outer circumferential or peripheral portion of the protective circuit module 110 and a second opening 112*b* formed in the shape of a rectangular slot Inside the protective circuit module 110. The first opening 112*a* defines a step difference T1 in the periphery of the protective circuit module 110 (e.g., the first opening 112*a* may have a depth T1 in a portion of the periphery of the protective circuit module 110). One of the flange portions 152 may be mounted in the first opening 112*a* such that the flange portion 152 is parallel to the peripheral portion of the first opening 112*a*. When the flange portion 152 is received in the first opening 112*a*, the flange portion 152 may be flush with a periphery of the protective circuit module 110. For example, the step difference T1 between the first opening 112*a* and the peripheral portion of the protective circuit module 110 may be provided to approximately correspond to the thickness T2 of the flange portion 152. The second opening 112*b* may be provided in a size corresponding to the size of the other flange portion 152 of the terminal 150. Mounting the flange portions 152 in the openings 112 so that the terminal 150 is provided on the protective circuit module 110 both guides the terminal 150 into the proper position on the protective circuit module 110 and facilitates coupling the terminal 150 to the protective circuit module 110 by inserting the fastening members 30 through the first and second fastening portions 115*c* and 113.

The body portions 153 and 154 may include first and second body portions 153 and 154 respectively provided at opposite ends 151*b* of the base portion 151 of the support portions 151 and 152. The body portions 153 and 154 extend parallel to each other while being spaced apart from each other. The body portions 153 and 154 may be provided with the extending portions 155, 156, 157 and 158. The extending portions 155, 156, 157 and 158 may include first and second extending portions 155 and 157 respectively provided at opposite ends of the first body portion 153, and third and fourth extending portions 156 and 158 respectively provided at opposite ends of the second body portion 154. In the illustrated embodiment, the first and second extending portions 155 and 157 extend in generally opposite directions and the third and fourth extending portions 156 and 158 extend in generally opposite directions. Together, the first to fourth extending portions 155, 156, 157 and 158 may be provided as two pairs of extending portions respectively formed at upper and lower portions of the terminal 150. The first extending portion 155 may be opposite to the third extending portion 156, and the second extending portion 157 may be opposite to the fourth extending portion 158.

The body portions 153 and 154 may respectively Include first areas 153*a* and 154*a* (e.g., flanges) extending along the ends 151*b* of the base portion 151 and having a width corresponding to that of the base portion 151 of the support portions 151 and 152. The body portions 153 and 154 may also Include second areas 153*b* and 154*b* (e.g., posts) extending upward from the first areas 153*a* and 154*a*, respectively. In the Illustrated embodiment, the second areas 153*b* and 154*b* are narrower than the first areas 153*a* and 154*a*. The first to fourth extending portions 155, 156, 157 and 158 are provided on the second areas 153*b* and 154*b*, and may be provided adjacent to upper portions of the first and second body portions 153 and 154.

The portion at which each of the body portions 153 and 154 and the base portion 151 are coupled to each other may be formed in a shape bent so that each of the body portions 153 and 154 and the base portion 151 are approximately perpendicular to each other. Therefore, the rigidity of the portion at which each of the body portions 153 and 154 and the base portion 151 are coupled to each other may be relatively weak. In this case, the first areas 153*a* and 153*b* of the body portions 153 and 154 have a width corresponding to a width of the base portion 151, so that it is possible to improve the rigidity of the portion at which each of the body portions 153 and 154 and the base portion 151 are coupled to each other. Further, the first to fourth extending portions 155, 156, 157 and 158 are provided on the second areas 153*b* and 154*b* of the body portions 153 and 154, so that it is possible to efficiently reduce the space that the terminal 150 occupies in the protective circuit module 110. In one embodiment, the end of at least one of the first to fourth extending portions 155, 156, 157 and 158 may be parallel to the first and second body portions 153 and 154. The first and second extending portions 155 and 157 are provided on the first body portion 153 and may extend in opposite directions from each other (e.g., in the x and −x directions). The third and fourth extending portions 156 and 158 are provided on the second body portion 154 and may extend in opposite directions from each other (e.g., in the x and −x directions). The first and third extending portions 155 and 156 may be respectively provided at one end of each of the first and second body portions 153 and 154 and extend toward each other. The second and fourth extending portions 157 and 158 may be respectively provided at the other end of each of the first and second body portions 153 and 154 and extend toward each other. As illustrated in FIG. 3, the first to fourth extending portions 155, 156, 157 and 158 may respectively include inclination portions 155*a*, 156*a*, 157*a* and 158*a* directly coupled at opposite ends of the first and second body portions 153 and 154 and extending toward each other, contact portions 155*b*, 156*b*, 157*b* and 158*b* defined where the inclination portions 155*a*, 156*a*, 157*a* and 158*a* contact each other and extending in directions parallel to the first and second body portions 153 and 154, and spacing portions 155*c*, 156*c*, 157*c* and 158*c* diverging or extending away from each other starting at the contact portions 155*b*, 158*b*, 157*b* and 158*b*.

The inclination portions 155*a* and 156*a* in the first and third extending portions 155 and 156, respectively, may be inclined or converging to meet each other at the contact portions 155*b* and 156*b*, and the contact portions 155*b* and 156*b* may contact each other. In this case, the inclination portions 155*a* and 156*a* may press the contact portions 155*b* and 156*b* against each other. The spacing portions 155*c* and 156*c* may be provided along directions diverging from each other to form a space therebetween. The relationship between the first and third extending portions 155 and 156 may be similar to that between the second and fourth extending portions 157 and 158.

To couple the terminal 150 to an external device (e.g., a portable electronic device), an electrical ground portion of the external device may be inserted in either direction between the extending portions 155, 156, 157, and 158. For example, when the terminal 150 is coupled to an external device, a flat-shaped electrical ground portion of the external device may be inserted between the second and fourth extending portions 157 and 158 by passing the electrical ground portion of the external device between the first and third extending portions 155 and 156. In contrast, the electrical ground portion of the external device may be inserted between the first and third extending portions 155 and 156 by passing the electrical ground portion of the external device between the second and fourth extending portions 157 and 158. Hereinafter, the case where the electrical ground portion of the external device is Inserted between the first and third extending portions 155 and 156 will be described.

The flat-shaped electrical ground portion provided to perform electrical connection to the external device may be inserted between the spacing portions 155*c* and 156*c* of the first and third extending portions 155 and 156, respectively, and be electrically coupled at the contact portions 155*b* and 156*b*. In this case, the spacing portions 155*c* and 156*c* may provide a space to facilitate the insertion of the electrical ground portion, and the contact portions 155*b* and 156*b* may facilitate the electrical connection of the electric ground portion to the terminal 150. The Inclination portions 155*a* and 156*a* may stably maintain the contact between the contact portions 155*b* and 156*b* and the electrical ground portion (i.e., inclination portions 155*a* and 156*a* may be configured to bias or force the contact portions 155*b* and 156*b* of the terminal 150 into engagement with the electrical ground portion of the external device to maintain a stable electrical connection between the terminal 150 and the external device). The electrical ground portion passes between the third and fourth extending portions 156 and 158 provided opposite to the first and second extending portions 155 and 157, and thus it is possible to improve the electrical flow. Further, the electrical ground portion can be stably fixed physically (i.e., mechanically) to the terminal 150.

The terminal 150 may be formed in a shape in which the extending portions 155, 156, 157 and 158 respectively provided at opposite ends of the body portions 153 and 154 are symmetric to each other about centerlines C1 and C2 of the body portions 153 and 154. That is, the first and third extending portions 155 and 156 may be symmetric to the second and fourth extending portions 157 and 158 about the centerline C2 of the body portions 153 and 154 extending in the z-direction, and the first and second extending portions 155 and 157 may be symmetric to the third and fourth extending portions 156 and 158 about the centerline C1 of the body portions 153 and 154 extending along the x-direction.

Hereinafter, other embodiments of the present invention will be described with reference to FIGS. 4A to 7B. Contents of these embodiments, except the following contents, are similar to those of the embodiment described with reference to FIGS. 1 to 3, and therefore, their detailed descriptions will be omitted.

Figure 4A:
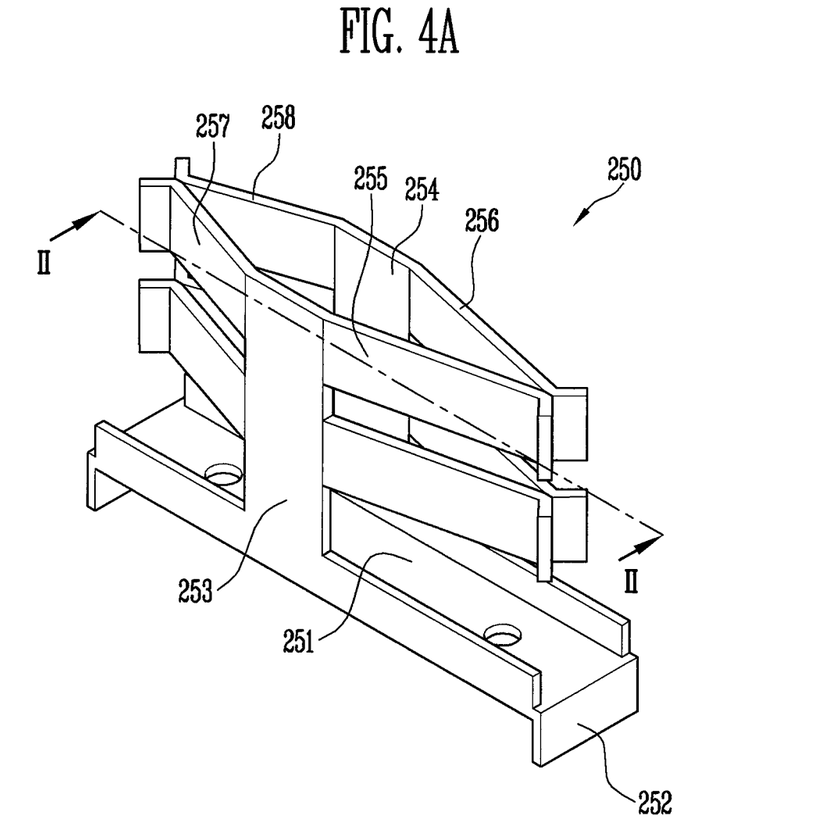
FIG. 4A is a perspective view of a terminal according to another embodiment of the present Invention.
Figure 4B:
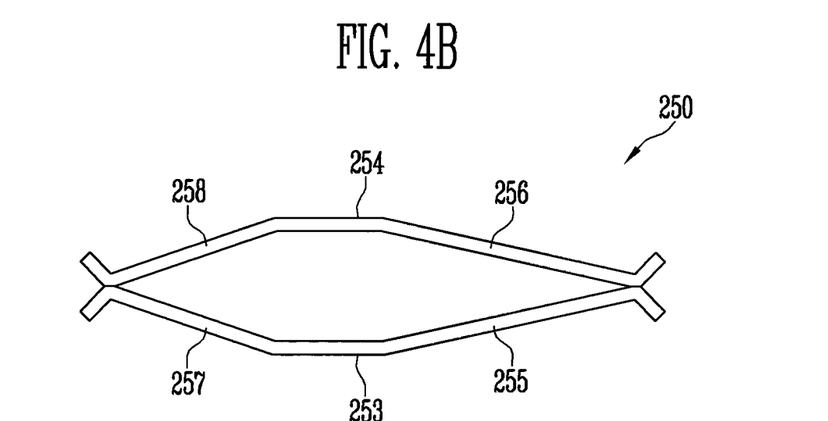
FIG. 4B is a sectional view taken along the line II-II of the terminal of FIG. 4A.

FIG. 4A is a perspective view of a terminal according to another embodiment of the present invention. FIG. 4B is a sectional view taken along the line II-II of the terminal of FIG. 4A.

Referring to FIGS. 4A and 4B, the terminal 250 according to this embodiment may include support portions 251 and 252 provided at a lower portion of the terminal 250 to be coupled to the protective circuit module, a pair of first and second body portions 253 and 254 extending upward from the support portions 251 and 252, and first to fourth extending portions 255, 256, 257 and 258 extending outward in generally opposite directions from opposite sides of the first and second body portions 253 and 254. In one embodiment, the first to fourth extending portions 255, 256, 257 and 258 may extend perpendicular to the first and second body portions 253 and 254. For example, the first and second extending portions 255 and 257 may extend from opposite ends of the first body portion 253 in directions opposite or generally opposite to each other, and the third and fourth extending portions 256 and 258 may extend from opposite ends of the second body portion 254 in directions opposite or generally opposite to each other. In this case, the first and third extending portions 255 and 256 may be provided opposite to each other, and the second and fourth extending portions 257 and 258 may be provided opposite to each other.

In the terminal 250, the extending portions 255, 256, 257 and 258 are provided to be symmetric to each other in a direction parallel to the first and second body portions 253 and 254 (e.g., the first and second extending portions 255 and 257 may be symmetric to the third and fourth extending portions 256 and 258 about a centerline equidistant between the body portions 253 and 254 and extending parallel to the first and second body portions 253 and 254). However, the extending portions may be formed in different sizes in a direction perpendicular to the first and second body portions 253 and 254 (e.g., the extending portions may be asymmetric about the axis perpendicular to the first and second body portions 253 and 254). For example, the sizes of the first and third extending portions 255 and 256 are provided to correspond to each other, and the sizes of the second and fourth extending portions 257 and 258 are provided to correspond to each other. In this case, the size of the first and third extending portions 255 and 256 may be greater than that of the second and fourth extending portions 257 and 258.

In use, a flat-shaped electrical ground portion provided to perform electrical connection to an external device (e.g., a portable electronic device) may be electrically coupled to the terminal 250 according to this embodiment. In this case, the electrical ground portion may protrude toward the second and fourth extending portions 257 and 258 by passing the electrical ground portion between the first and third extending portions 255 and 256. That is, the shape of the terminal 250 is asymmetric so that it is possible to achieve the desired positional relationship between the electrical ground portion of the external device and the terminal 250. Further, in the embodiment Illustrated in FIGS. 4A and 4B, the size of the second and fourth extending portions 257 and 258 is decreased compared to the first and third extending portions 255 and 256 so that the entire volume of the terminal 250 can be decreased. Decreasing the entire volume of the terminal 250 further improves the efficient use of space on the protective circuit module.

Figure 5A:
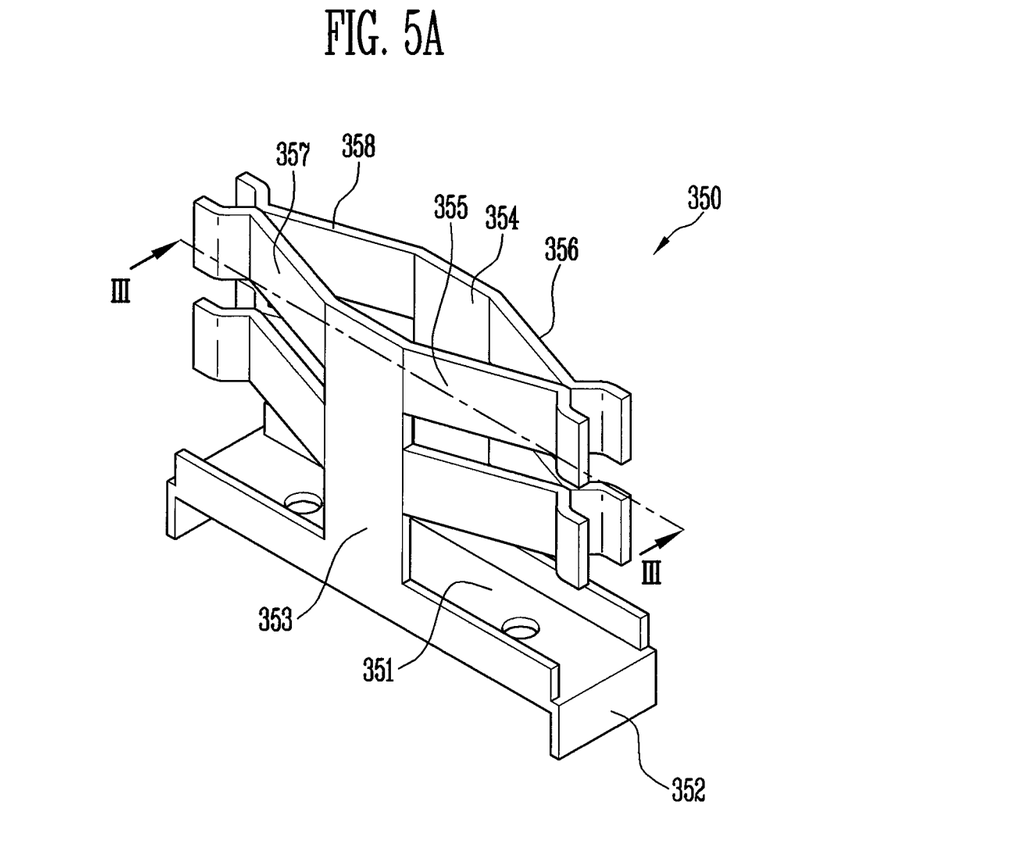
FIG. 5A is a perspective view of a terminal according to still another embodiment of the present invention.
Figure 5B:
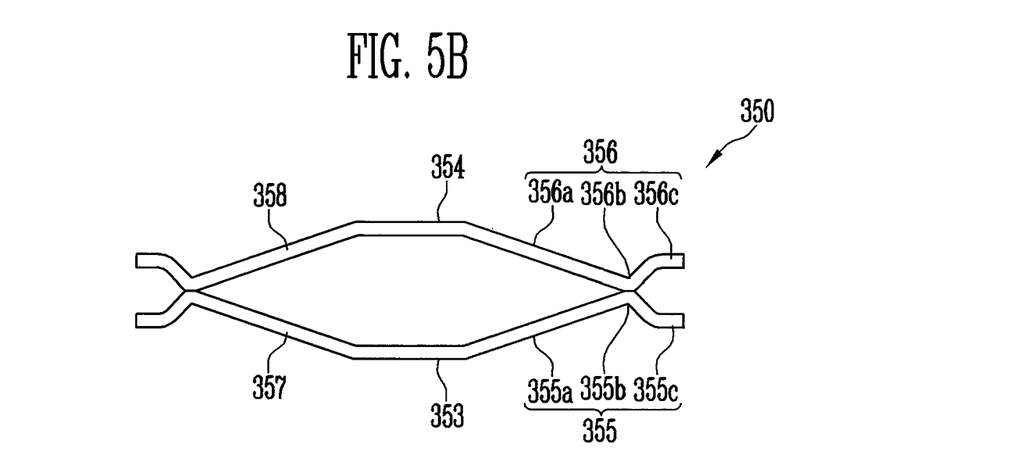
FIG. 5B is a sectional view taken along the line III-III of the terminal of FIG. 5A.

FIG. 5A is a perspective view of a terminal according to still another embodiment of the present Invention. FIG. 5B is a sectional view taken along the line III-III of the terminal of FIG. 5A.

Referring to FIGS. 5A and 5B, the terminal 350 according to this embodiment may include a pair of first and second body portions 353 and 354 provided at an approximately central portion of the terminal 350, support portions 351 and 352 configured to be coupled to the protective circuit module and supporting the first and second body portions 353 and 354 at lower portions of the first and second body portions 353 and 354, and first to fourth extending portions 355, 356, 357 and 358 extending outward from opposite ends of the first and second body portions 353 and 354.

The first and third extending portions 355 and 356 may be opposite to each other and the second and fourth extending portions 357 and 358 may be opposite to each other. The first and third extending portions 355 and 356 may be symmetric to the second and fourth extending portions 357 and 358 about a centerline equidistant between the body portions 353 and 354 and extending parallel to the first and second body portions 353 and 354. Hereinafter, the first and third extending portions 355 and 356 will be primarily described. This description may also apply equally or similarly to the second and fourth extending portions 357 and 358.

The first and third extending portions 355 and 356 extend from one end of each of the first and second body portions 353 and 354, respectively. The first and third extending portions 355 and 356 may be divided sequentially into inclination portions 355a and 356a, contact portions 355b and 356b, and spacing portions 355c and 356c, respectively. An electrical ground portion of an external electronic device (e.g., a portable electronic device) may be electrically coupled to the terminal 350 by inserting the electrical ground portion through the spacing portions 355c and 356c until the electrical ground portion is engaged by, and electrically coupled to, the contact portions 355b and 355c. The inclination portions 355a and 355b support the contact between the contact portions 355b and 356b and the electrical ground portion (e.g., inclination portions 355a and 355b may be configured to bias or force the contact portions 355b and 355c of the terminal 350 into engagement with the electrical ground portion of the external device to maintain a stable electrical connection between the terminal 350 and the external device). The electrical ground portion of the external electronic device may pass between the first and second body portions 353 and 354 and be inserted between the second and fourth extending portions 357 and 358.

In the embodiment Illustrated in FIGS. 5A and 5B, the spacing portions 355c and 356c may be rounded (e.g., the spacing portions 355c and 356c may be curved). Curving or rounding the spacing portions 355c and 356c may increase the space between the spacing portions 355c and 356c, which helps facilitate ease of Insertion of the electrical ground portion of the external electronic device between the spacing portions 355c and 356c.

Figure 6A:
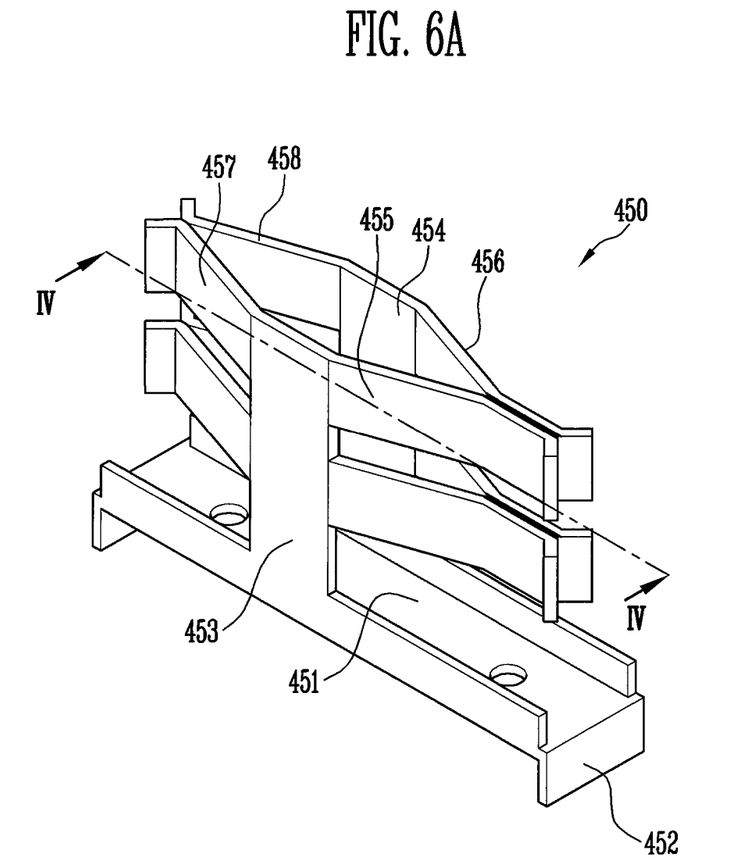
FIG. 6A is a perspective view of a terminal according to still another embodiment of the present invention.
Figure 6B:
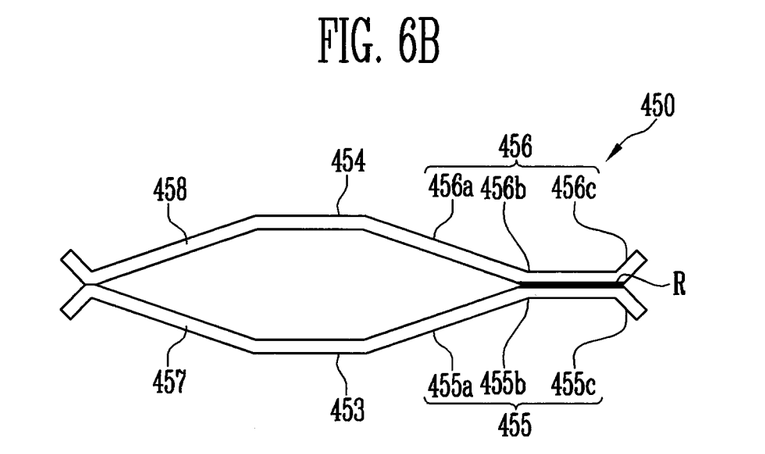
FIG. 6B is a sectional view taken along the line IV-IV of the terminal of FIG. 6A.

FIG. 6A is a perspective view of a terminal according to still another embodiment of the present invention. FIG. 6B is a sectional view taken along the line IV-IV of the terminal of FIG. 6A.

Referring to FIGS. 6A and 6B, the terminal 450 according to this embodiment may include a pair of first and second body portions 453 and 454 opposite to each other, support portions 451 and 452 provided at lower portions of the first and second body portions 453 and 454 configured to be coupled to the protective circuit module, and first to fourth extending portions 455, 456, 457 and 458 provided at opposite ends of the first and second body portions 453 and 454. The first and second extending portions 455 and 457 may be provided at opposite ends of the first body portion 453 and extending in directions opposite or generally opposite from each other, and the third and fourth extending portions 456 and 458 may be provided at opposite ends of the second body portion 454 and extending in directions opposite or generally opposite from each other. For example, the first body portion 453 and the first and second extending portions 455 and 457 may be symmetric to the second body portion 454 and the third and fourth extending portions 456 and 458 about a centerline equidistant between the body portions 453 and 454 and extending parallel to the first and second body portions 453 and 454.

The first and third extending portions 455 and 456 are provided at one end of the first and second body portions 453 and 454, respectively. In one embodiment, the first and third extending portions 455 and 456 may each include at least one portion where the first and third extending portions 455 and 456 contact each other. The second and fourth extending portions 457 and 458 are provided at the other end of the first and second body portions 453 and 454, respectively. In one embodiment, the second and fourth extending portions 457 and 458 may each include at least one portion where the second and fourth extending portions 457 and 458 contact each other. In one embodiment, the portion where the first and third extending portions 455 and 456 contact each other or the portion where the second and fourth extending portions 457 and 458 contact each other may further include a surface roughness R. Hereinafter, the embodiment where the surface roughness R is provided on the first and third extending portions 455 and 456 will be described.

The first and second extending portions 455 and 456 may sequentially include inclination portions 455a and 456a extended in directions converging toward each other, contact portions 455b and 456b contacting each other, and spacing portions 455c and 456c extending in directions diverging apart from each other, respectively. The contact portions 455b and 456b are portions contacting each other and the surface roughness R may be formed in either one or both of the contact portions 455b and 456b.

The terminal 450 according to this embodiment may transfer current through an electrical ground portion of an external device. The electrical ground portion may be inserted between the spacing portions 455c and 456c and electrically coupled to the terminal 450 at the contact portions 455b and 455c. The electrical ground portion may be Inserted between the second and fourth extending portions 457 and 458 by passing the electrical ground portion between the inclination portions 455a and 456a. In one embodiment, the surface roughness R is provided to the contact portions 455b and 456b to increase the friction between the electrical ground portion of the external device and the contact portions 455b and 456b of the terminal 450 and thereby more firmly secure the electrical connection between the electrical ground portion and the terminal 450. Further, the surface roughness R increases the contact area between the electrical ground portion of the external device and the contact portions 455b and 456b of the terminal 450, which allows current to more efficiently flow between the terminal 450 and the electrical ground portion of the external device.

Figure 7A:
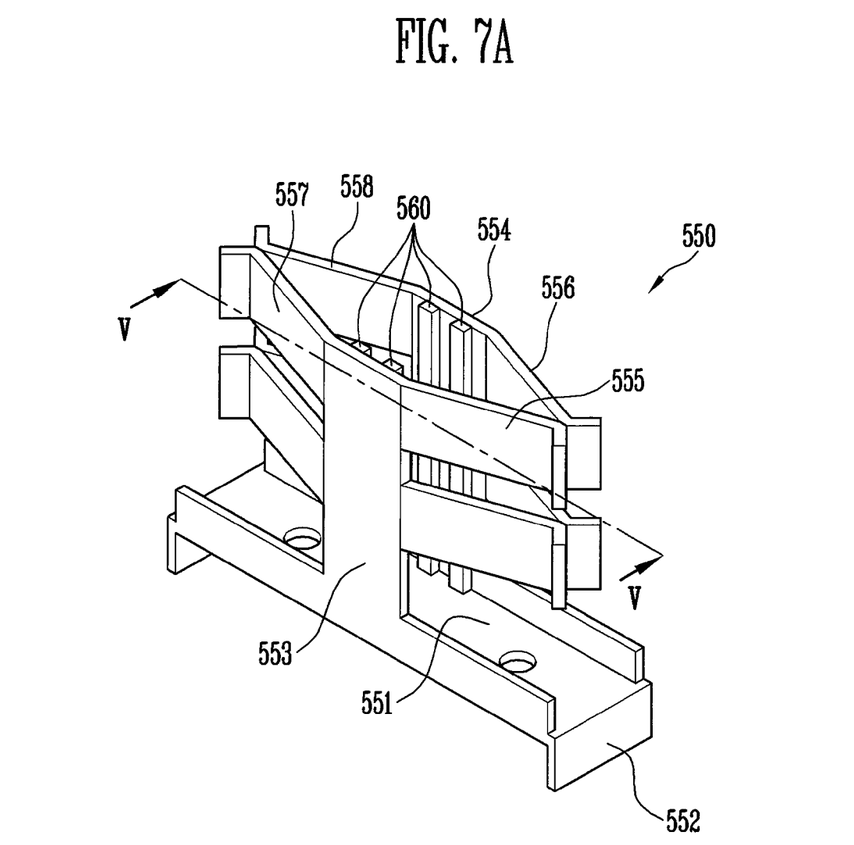
FIG. 7A is a perspective view of a terminal according to still another embodiment of the present invention.
Figure 7B:
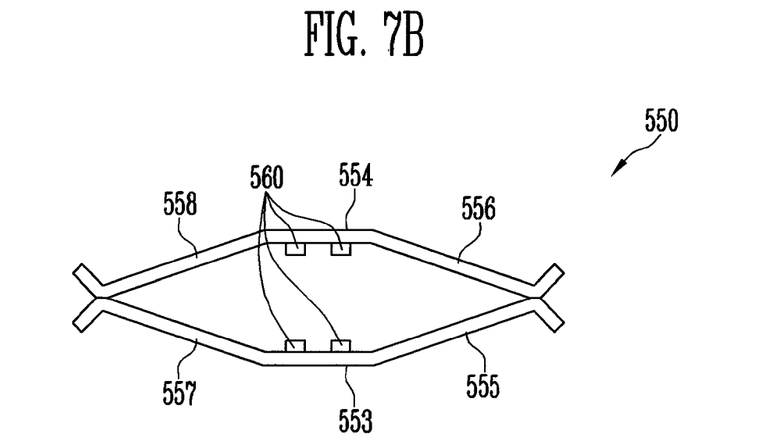
FIG. 7B is a sectional view taken along the line V-V of the terminal of FIG. 7A.

FIG. 7A is a perspective view of a terminal according to still another embodiment of the present invention. FIG. 7B is a sectional view taken along the line V-V of the terminal of FIG. 7A.

Referring to FIGS. 7A and 7B, the terminal 550 according to this embodiment may include a pair of first and second body portions 553 and 554, support portions 551 and 552 provided at lower portions of the first and second body portions 553 and 554, and first to fourth extending portions 555, 556, 557 and 558 coupled to the first and second body portions 553 and 554. The first and second extending portions 555 and 557 may be provided at opposite ends of the first body portion 553, and the third and fourth extending portions 556 and 558 may be provided at opposite ends of the second body portion 554. The first extending portion 555 may be opposite to the third extending portion 556, and the second extending portion 557 may be opposite to the fourth extending portion 558.

In one embodiment, the first and second body portions 553 and 554 may have surfaces facing each other. Each of the first and second body portions 553 and 554 may have one or more ribs 560 on the surfaces facing each other. The one or more ribs 560 extend along the length of the first and second body portions 553 and 554 and extend Inward toward the other body portion 553 and 554. In one embodiment, the one or more ribs 560 may extend all the way to the lower ends of the first and second body portions 553 and 554 such that the ribs 560 are adjacent to the support portions 551 and 552 at the lower ends of the first and second body portions 553 and 554. The ribs 560 are provided on the first and second body portions 553 and 554 to improve the rigidity of the first and second body portions 553 and 554, thereby increasing the lifespan of the terminal 550.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A battery pack, comprising:
one or more bare cells;
a protective circuit module electrically coupled to the one or more bare cells, the protective circuit module having a first surface; and
one or more terminals on the first surface of the protective circuit module to be electrically coupled to an external device,
wherein at least one of the terminals includes a support portion coupled to the protective circuit module, a pair of body portions extended in a direction away from the first surface of the protective circuit module at the support portion, and a plurality of extending portions extending in different directions from opposite sides of the pair of body portions, and
wherein the extending portions extend parallel to the first surface of the protective circuit module.

2. The battery pack of claim 1, wherein the support portion comprises a base portion parallel to the first surface, and a pair of flange portions at opposite ends of the base portion perpendicular to the first surface.

3. The battery pack of claim 2, wherein the base portion has one or more first fastening portions defined therein, and the protective circuit module has a second fastening portion coupled to the one or more first fastening portions.

4. The battery pack of claim 2, wherein the protective circuit module has one or more openings in which one or more of the pair of flange portions are mounted.

5. The battery pack of claim 4, wherein the one or more openings in the protective circuit module Includes a first opening at an outer peripheral portion of the protective circuit module and a second opening having a shape of a rectangular slot Inside the protective circuit module.

6. The battery pack of claim 1, wherein:
the pair of body portions comprises first and second body portions at opposite ends of the base portion, the first and second body portions extending in parallel to each other and spaced from each other; and
the extending portions include first and second extending portions at opposite ends of the first body portion, and third and fourth extending portions at opposite ends of the second body portion.

7. The battery pack of claim 6, wherein each of the first and second body portions comprises a first area having a width corresponding to a width of the support portion, and a second area extending from the first area, the second area having a width narrower than the width of the first area.

8. The battery pack of claim 7, wherein the first to fourth extending portions are coupled to the second area, and
wherein the first to fourth extending portions are adjacent upper portions of the first and second body portions.

9. The battery pack of claim 6, wherein:
the first and third extending portions are respectively at one end of the first and second body portions and extend toward each other; and the second and fourth extending portions are respectively at an opposite end of the first and second body portions and extend toward each other.

10. The battery pack of claim 9, wherein the first to fourth extending portions respectively comprise:
inclination portions directly coupled at opposite ends of the first and second body portions and converging toward each other;
contact portions coupled to the Inclination portions and extending in a direction parallel to the first and second body portions; and
spacing portions coupled to the contact portions and diverging from each other at the contact portions.

11. The battery pack of claim 10, wherein the spacing portions are rounded.

12. The battery pack of claim 9, wherein:
sizes of the first and third extending portions are the same;
sizes of the second and fourth extending portions are the same, and
the sizes of the first and third extending portions are greater than the sizes of the second and fourth extending portions.

13. The battery pack of claim 9, wherein:
at least a portion of each of the first and third extending portions contact each other, and
at least a portion of each of the second and fourth extending portions contact each other.

14. The battery pack of claim 13, wherein the portion at which the first and third extending portions contact each other or the portion at which the second and fourth extending portions contact each other further includes surface roughness.

15. The battery pack of claim 1, wherein the extending portions are symmetric to each other about a centerline of the pair of body portions.

16. The battery pack of claim 1, wherein the pair of body portions Includes a pair of surfaces facing each other, and one or more ribs are on each of the surfaces facing each other.

17. The battery pack of claim 16, wherein:
the one or more ribs extend along a direction in which the first and second body portions extend; and
the one or more ribs extend to a lower end portion of the first body portion or the second body portion adjacent to the support portion.

18. The battery pack of claim 1, wherein:
the protective circuit module is opposite to the one or more bare cells; and
the first surface of the protective circuit module is opposite to an Inner surface of the protective circuit module facing the one or more bare cells.

* * * * *